US008421804B2

(12) United States Patent
Ostermann et al.

(10) Patent No.: US 8,421,804 B2
(45) Date of Patent: Apr. 16, 2013

(54) SYSTEM AND METHOD OF STREAMING 3-D WIREFRAME ANIMATIONS

(75) Inventors: Joern Ostermann, Morganville, NJ (US); Sokratis Varakliotis, London (GB)

(73) Assignee: AT&T Intellectual Property II, L.P., Atlanta, GA (US)

( * ) Notice: Subject to any disclaimer, the term of this patent is extended or adjusted under 35 U.S.C. 154(b) by 798 days.

(21) Appl. No.: 11/059,118

(22) Filed: Feb. 16, 2005

(65) Prior Publication Data

US 2006/0181536 A1    Aug. 17, 2006

(51) Int. Cl.
*G06T 13/00*    (2011.01)
(52) U.S. Cl.
USPC .......................................................... 345/473
(58) Field of Classification Search .................. 345/428, 345/473–475
See application file for complete search history.

(56) References Cited

U.S. PATENT DOCUMENTS

| | | | | |
|---|---|---|---|---|
| 5,818,463 A * | 10/1998 | Tao et al. | ........................ | 345/473 |
| 5,953,506 A * | 9/1999 | Kalra et al. | .................... | 709/231 |
| 6,047,088 A * | 4/2000 | van Beek et al. | ............. | 382/232 |
| 6,085,252 A * | 7/2000 | Zhu et al. | ....................... | 709/231 |
| 6,148,026 A * | 11/2000 | Puri et al. | ....................... | 375/240 |
| 6,215,503 B1 * | 4/2001 | Snyder et al. | .................. | 345/629 |
| 6,262,737 B1 * | 7/2001 | Li et al. | ........................... | 345/419 |
| 6,339,618 B1 * | 1/2002 | Puri et al. | .................. | 375/240.16 |
| 6,452,596 B1 * | 9/2002 | Gueziec et al. | ................ | 345/440 |
| 6,510,177 B1 * | 1/2003 | De Bonet et al. | ........ | 375/240.16 |
| 6,563,500 B1 * | 5/2003 | Kim et al. | ...................... | 345/423 |
| 6,577,310 B1 * | 6/2003 | Kim et al. | ...................... | 345/427 |
| 6,608,628 B1 * | 8/2003 | Ross et al. | ..................... | 345/619 |
| 6,611,262 B1 * | 8/2003 | Suzuki | .......................... | 345/419 |
| 6,614,428 B1 * | 9/2003 | Lengyel | ........................ | 345/420 |
| 6,668,091 B1 * | 12/2003 | Kim et al. | ..................... | 382/243 |
| 6,677,949 B1 * | 1/2004 | Gioia | ............................. | 345/428 |
| 6,947,045 B1 * | 9/2005 | Ostermann et al. | ........... | 345/473 |
| 7,071,936 B2 * | 7/2006 | Hoppe et al. | .................. | 345/420 |
| 7,224,358 B2 * | 5/2007 | Hoppe et al. | .................. | 345/420 |
| 2002/0146074 A1 * | 10/2002 | Ariel et al. | ............... | 375/240.27 |
| 2002/0157058 A1 * | 10/2002 | Ariel et al. | ..................... | 714/774 |
| 2002/0167518 A1 * | 11/2002 | Migdal et al. | ................. | 345/428 |
| 2004/0151247 A1 * | 8/2004 | Sanson et al. | ............ | 375/240.16 |
| 2004/0249617 A1 * | 12/2004 | Lau et al. | .......................... | 703/2 |
| 2005/0012742 A1 * | 1/2005 | Royan | .......................... | 345/419 |
| 2005/0152397 A1 * | 7/2005 | Bai et al. | ........................ | 370/468 |
| 2006/0012601 A1 * | 1/2006 | Francini et al. | ............... | 345/473 |
| 2007/0005795 A1 * | 1/2007 | Gonzalez | ...................... | 709/232 |

OTHER PUBLICATIONS

A. E. Mohr, E. A. Riskin, and R. E. Ladner, "Unequal loss protection: Graceful degradation of image quality over packet erasure channels through forward error correction," Jun. 2000, IEEE Journal on Selected Areas in Communications, vol. 18, No. 6, pp. 819-828.*

(Continued)

*Primary Examiner* — Xiao M. Wu
*Assistant Examiner* — Charles Tseng

(57) ABSTRACT

Optimal resilience to errors in packetized streaming 3-D wireframe animation is achieved by partitioning the stream into layers and applying unequal error correction coding to each layer independently to maintain the same overall bitrate. The unequal error protection scheme for each of the layers combined with error concealment at the receiver achieves graceful degradation of streamed animation at higher packet loss rates than approaches that do not account for subjective parameters such as visual smoothness.

10 Claims, 7 Drawing Sheets

OTHER PUBLICATIONS

Yang et al., View-Dependent Progressive Mesh Coding Based on Partitioning, Visual Communications and Image Processing 2002, Proc. SPIE 4671, Jan. 2002, pp. 268-279.*

G. Al-Regib et al. "An Unequal Error Protection Method for Packet Loss Resilient 3-D Mesh Transmission". The Conference on Computer Communications. 21st Annual Joint Conference of the IEEE Computer and Communications Societies. New York, NY. Jun. 23-27, 2002. vol. 1 of 3 pp. 743-752 (ISBN: 0-7803-7476-2 The entire document) XP01059636.

S. Varakliotis et al. "Coding of Animated 3-D Wireframe Models for Internet Streaming Applications". 2001 IEEE International Conference on Multimedia and Expo. Tokyo, Japan. Aug. 22, 2001. pp. 237-240. XP010661818.

Z. Karni et al. "Spectral Compression of Mesh Geometry". Computer Graphics. SIGGRAPH 2000 Conference Proceedings. New Orleans, LA. Jul. 23-28, 2000. Computer Graphics Proceedings. SIGGRAPH< New Yor, NY: ACM, US. Jul. 23, 2000. pp. 279-286. XP001003566.

Z. Yan et al. "Error-Resilient Coding of 3-D Graphic Models Via Adaptive Mesh Sementation". IEEE Transactions on Circuits and Systems for Video Technology, IEEE Inc. New York, NY, USA. Jul. 2001. vol. 11, No. 7, pp. 860-873. XP001083361.

P. Lechat et al. "Scalable Image Coding with Fine Granularity Based on Hierarchical Mesh". Proceedings of the SPIE, Bellingham, VA, USA. Jan. 1999. vol. 3653. No. 3653. Part 1-2. pp 1130-1142. XP000862993.

Varakliotis et al., "Optimally smooth error resilient streaming of 3D wireframe animations", Proceedings of SPIE Visual Communications and Image Processing (VCIP) (2003), Jul. 8-11, 2003, Lugano, Switzerland, vol. 5150, Nr. 1. pp. 1009-1022, ISSN 0277-786X, XP030080719.

* cited by examiner

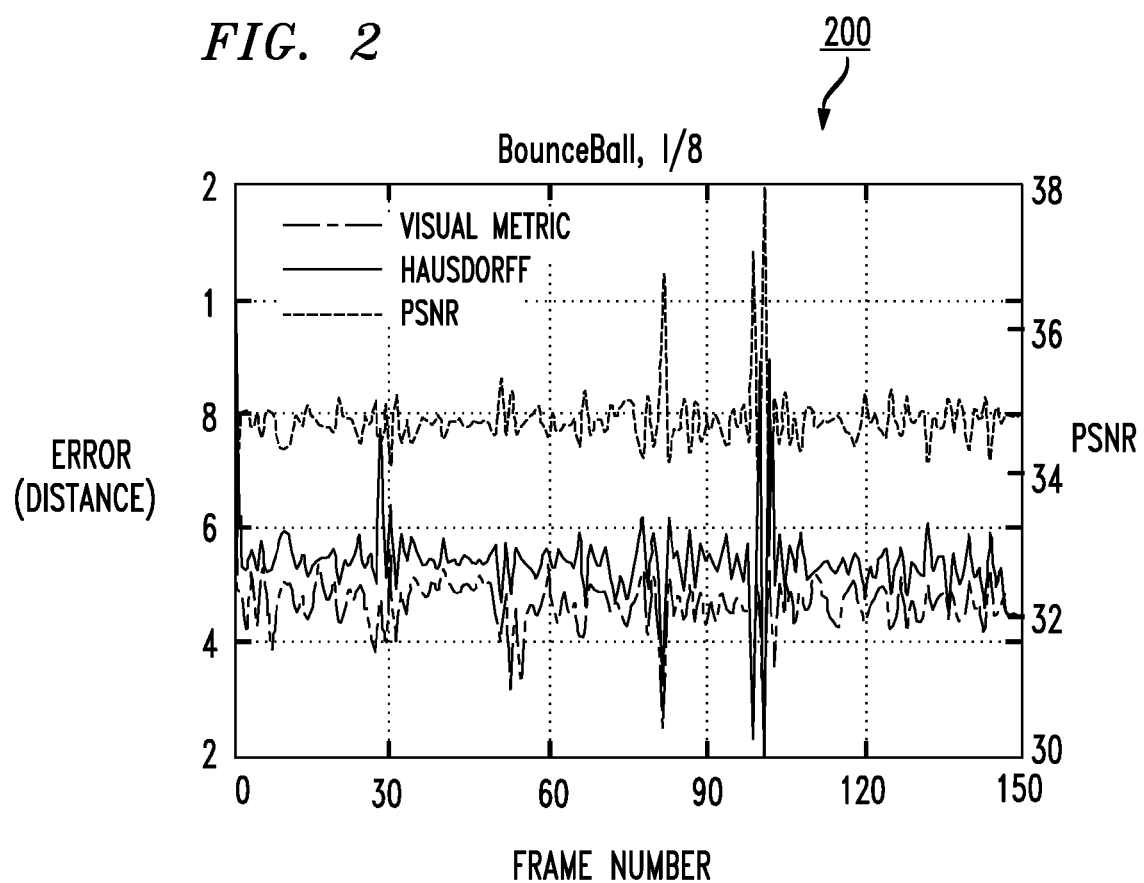

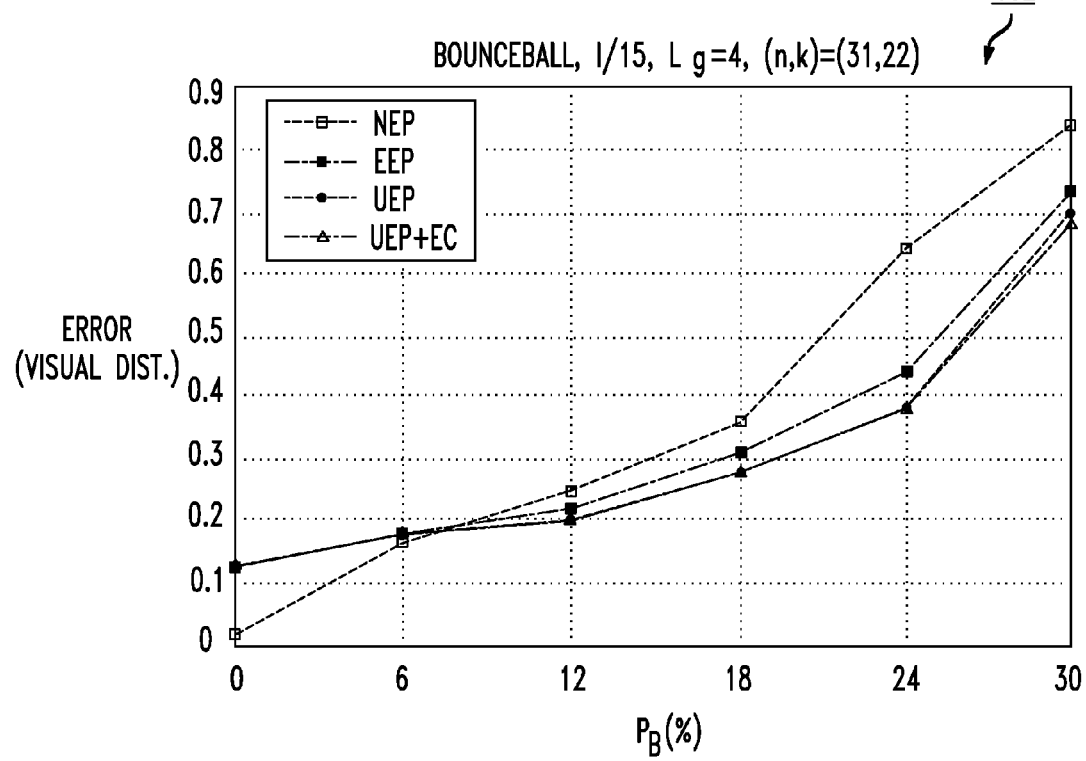

SYSTEM AND METHOD OF STREAMING 3-D WIREFRAME ANIMATIONS

PRIORITY CLAIM

The present Application is a continuation of PCT Application No. PCT/US 03/25761 filed on Aug. 15, 2003 which claims priority under 35 U.S.C. 119(e) to U.S. Provisional Patent Application No. 60/404,410, filed Aug. 20, 2002. The contents of these applications are incorporated herein by reference.

RELATED APPLICATION

The present application is related to Non-Provisional application Ser. No. 10/198,129, filed Jul. 19, 2002, assigned to the same assignee as that of the present application and fully incorporated herein by reference.

BACKGROUND OF THE INVENTION

1. Field of the Invention

The present invention relates to streaming data and more specifically relates to a system and method of streaming 3-D wireframe animations.

2. Introduction

The Internet has rapidly evolved during the past few years from a low-bandwidth, text-only collaboration medium, to a rich, interactive, real-time, audio-visual virtual world. It involves many users, environments and applications, where 3-D animations constitute a driving force. Animated 3-D models enable intuitive and realistic interaction with displayed objects and allow for effects that cannot be achieved with conventional audio-visual animations. Consequently, the current challenge is to integrate animated 3-D geometry as a new data stream in the existing evolving infrastructure of the Internet, in a way that both enhances the existing networked environment and respects its limited resources. Although static 3-D mesh geometry compression has been actively researched in the past decade, very little research has been conducted in compressing dynamic 3-D geometry, which is an extension of static 3-D meshes to the temporal domain.

The most prevalent representations for 3-D static models are polygonal or triangle meshes. These representations allow for approximate models of arbitrary shape and topology within some desired precision or quality. Efficient algorithms and data structures exist to generate, modify, compress, transmit and store such static meshes. Future, non-static, stream types that introduce the time dimension, would require scalable solutions to survive with respect to the network's limited resources (bandwidth) and characteristics (channel errors).

The problem of 3-D wireframe animation streaming addressed herein can be stated as follows: Assume (i) a time-dependent 3-D mesh has been scalably compressed in a sequence of wireframe animation frames, (ii) the available transmission rate R is known (or determined with respect to the corresponding TCP-friendly rate), (iii) the channel error characteristics are known, and (iv) a fraction C of the available transmission rate (C<R) can be reserved for channel coding. Then, the issue is to identify the optimal number of bits to be allocated to each level of importance (layer) in the animation scene that maximizes the perceived quality of the time-dependent mesh at the receiver.

Most animation coding approaches use objective metrics to achieve a hierarchical coding of static 3-D meshes. What is needed is an animation approach that utilizes a subjective quantity, such as visual smoothness, to provide an improved appearance of animation. Described herein is a 3-D wireframe animation codec and its bitstream content, along with the associated forward error correction (FEC) codes. The visual distortion metric as well as the unequal error protection (UEP) method and receiver-based concealment method are further explained.

SUMMARY OF THE INVENTION

The present invention focuses on source and channel coding techniques for error resilient time-dependent 3-D mesh streaming over the Internet that respects network bandwidth and considers the bursty loss nature of the channel.

An exemplary embodiment of the invention is a method of streaming data comprising computing a visual smoothness value for each node in a wireframe mesh and layering data associated with the wireframe mesh into a plurality of layers such that an average visual smoothness value associated with each layer reflects the respective layer's importance in an animation sequence. Other embodiments of the invention may include a bitstream generated according to a process similar to the above method and an apparatus of generating and transmitting a bitstream or receiving a bitstream.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 is a comparative plot of distortion metrics including PSNR, Hausdorff Distance and Visual Smoothness;

FIG. 6 is a comparative plot of Visual Smoothness between transmitted and decoded frames of 2 layers of wireframe animation BOUNCEBALL.

DETAILED DESCRIPTION OF THE INVENTION

Figure 1A:
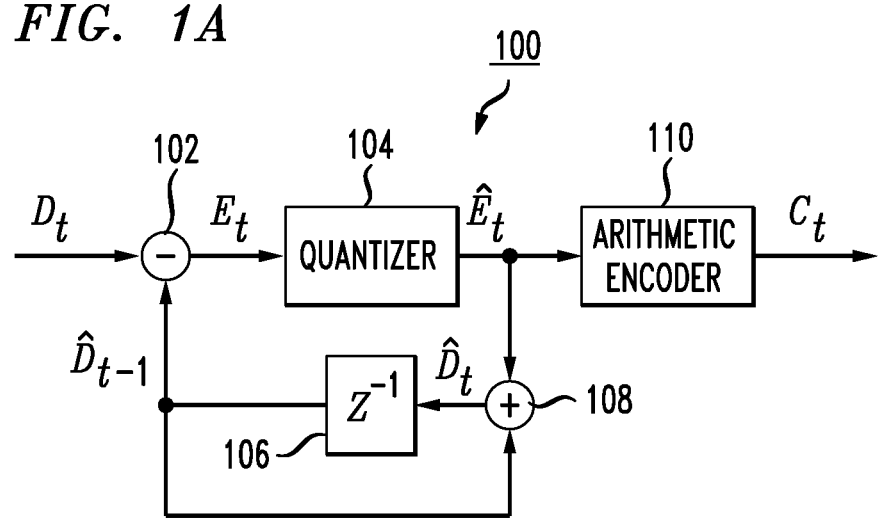
FIG. 1A is a block diagram of a 3-D Animation codec.

Much research has been undertaken to study streaming video across computer networks in general and over the Internet in particular. Relatively little has been undertaken in the field of streaming 3-D wireframe animation. Although both processes may have some similarities, the two are significantly different. Different data passes across the network, so loss affects signal reconstruction differently. The perceptual effects of such loss have been poorly addressed in the art. Much of the work in this area relied on objective measures such as PSNR in lieu of those that take subject effects into account.

The present invention brings together concepts from a number of fields to address the problem of how to achieve optimal resilience to errors in terms of the perceptual effect at the receiver. In this regard, the invention relates to a subjective quality of an animation, for example, the mesh surface smoothness. To achieve an improved coding scheme taking subjective factors into account, an aspect of the invention comprises partitioning the animation stream into a number of layers and applying Reed-Solomon (RS) forward error correction (FEC) codes to each layer independently and in such a way as to maintain the same overall bitrate whilst minimizing the perceptual effects of error, as measured by a distortion metric related to static 3-D mesh compression. Graceful degradation of streamed animations at higher packet loss rates than other approaches can be achieved by the unequal error protection (UEP) approach combined with error concealment (EC) and an efficient packetization scheme.

The present disclosure first provides an overview of the 3D-Animation codec that introduces the related notation, followed by an overview of the error correcting RS codes follows together with derivation of the channel model, as well as an exemplary description of UEP packetization for the encoded bitstream.

The vertices $m_j$ of a time-dependent 3-D mesh form the indexed set $M_t = \{m_{j,t}; j=1, 2, \ldots, n\}$, at time t, where n is the number of vertices in the mesh. Since a vertex has three space components $(x_j, y_j, z_j)$, and assuming that no connectivity changes occur in time (constant n), we can represent the indexed set's data at time t by the position matrix $M_t$, as:

$$M_t = \begin{bmatrix} x_{1,t} & x_{2,t} & \ldots & x_{n,t} \\ y_{1,t} & y_{2,t} & \ldots & y_{n,t} \\ z_{1,t} & z_{2,t} & \ldots & z_{n,t} \end{bmatrix}$$

The indexed set of vertices are partitioned into intuitively natural partitions, called nodes. The term "node" is used to highlight the correspondence of such nodes with the nodes as defined in the virtual reality markings language (VRML). The position matrix corresponding to the $i^{th}$ node is denoted by $N_{i,t}$. Note that without loss of generality, the vertex matrix can now be expressed as:

$$M_t = [N_{1,t} N_{2,t} \ldots N_{k,t}]$$

for k such nodes. For notational convenience, the terms $N_{i,t}$ (i=1, 2, ..., k) are used both for representing a matrix and to refer to the $i^{th}$ node as well. The objective of the 3D-Animation compression algorithm is to compress the sequence of matrices $M_t$ that form the synthetic animation, for transmission over a communications channel. Obviously, for freeform animations of a 3-D mesh the coordinates of the mesh may exhibit high variance, which makes the $M_t$ matrices unsuitable for compression. Hence, the signal can be defined as the set of non-zero displacements of all vertices in all nodes at time t:

$$D_k = \{d_{it} = m_{it} - m_{n0}, i=1,2,\ldots,p(p \leq n): d_{it} \neq 0\}$$

Following this notation, the above can be expressed with a displacement matrix, $D_t$, as:

$$D_t = M_t - M_0 \Leftrightarrow$$

$$D_t = \begin{bmatrix} x_{1,t} - x_{1,0} & x_{2,t} - x_{2,0} & \ldots & x_{p,t} - x_{p,0} \\ y_{1,t} - y_{1,0} & y_{2,t} - y_{2,0} & \ldots & y_{p,t} - y_{p,0} \\ z_{1,t} - z_{1,0} & z_{2,t} - z_{2,0} & \ldots & z_{p,t} - z_{p,0} \end{bmatrix}$$

or equivalently, using node matrices:

$$D_t = [F_{1,t} F_{2,t} \ldots F_{l,t}] \quad (1)$$

where $F_{i,t}$ the displacement matrix of node i, for 1 such nodes (i=1, 2, ..., 1). Note that $D_t$'s dimension is reduced to $p \leq n$ compared to $M_t$, since $D_t$ does not contain vertices for which the displacement on all axes is zero. Note, too, that $1 \leq k$ holds, in the event that no vertices in a node get displaced ($F_{i,t}=0$). In 3D-Animation terminology, sparse animations are referred to as those sequences with p<n and 1<k, whereas if p=n and 1=k the animation is called dense. It is evident that if an encoder is capable of controlling parameters p and 1, it can generate a layered bitstream (by adjusting parameter 1), where every layer L can be scalable (by adjusting parameter p). The sparsity (or density) of the animation is qualified by the density factor, defined as:

$$df = \frac{1}{F} \frac{1}{k} \sum_{f=1}^{F} \sum_{j=1}^{l} \frac{p_{jf}}{n_{jf}}, \text{ with } l \leq k \text{ and } p \leq n. \quad (2)$$

in the range [0 ... 1], where F is the number of animation frames and k the number of nodes in the reference model. For $p \rightarrow n$ and $1 \rightarrow k$, then $df \rightarrow 1$, therefore a complete animation.

The concept described and summarized in equation (1) above, is suited to a DPCM coder, as detailed below. The coding process assumes that the initial wireframe model $M_0$, here termed as the reference model, is already present at the receiver. The reference model can be compressed and streamed with an existing method for static 3-D mesh transmission, along with error protection if it is assumed the transmission is done over the same lossy channel as the time-dependent mesh. Such existing methods can accommodate and interoperate with static mesh transmissions and will not be discussed further here.

In the 3D-Animation codec's context, an I-frame describes changes from the reference model $M_0$ to the model at the current time instant t. A P-frame describes the changes of a model from the previous time instant t-1 to the current time instant t. The corresponding position and displacement matrices for I and P frames are denoted respectively by $M_t^I$, $M_t^P$, $D_t^I$, $D_t^P$.

FIG. 1A shows an exemplary block diagram 100 of a coding process according to an aspect of the invention. The diagram illustrates a DPCM encoder that takes advantage of the temporal correlation of the displacement of each vertex along every axis in the 3-D space. To encode a P-frame, the decoded set (animation frame or displacement matrix) of the previous instance is used as the predicted value 108, 106 $\hat{D}_{t-1}^P$. (Equivalently for encoding an I-frame the predicted matrix is $\hat{D}_{t-1}^I$ where at t=0 is the displacement matrix for the reference model.) Then, the prediction error $E_t$, i.e. the difference between the current displacement matrix and the predicted one 106 is computed 102 and quantized 104 ($\hat{E}_t$). Finally, the quantized samples are entropy coded ($C_t$) using an adaptive arithmetic coding algorithm 110 to handle the unknown data statistics. This predictive scheme prevents quantization error accumulation.

Figure 1B:
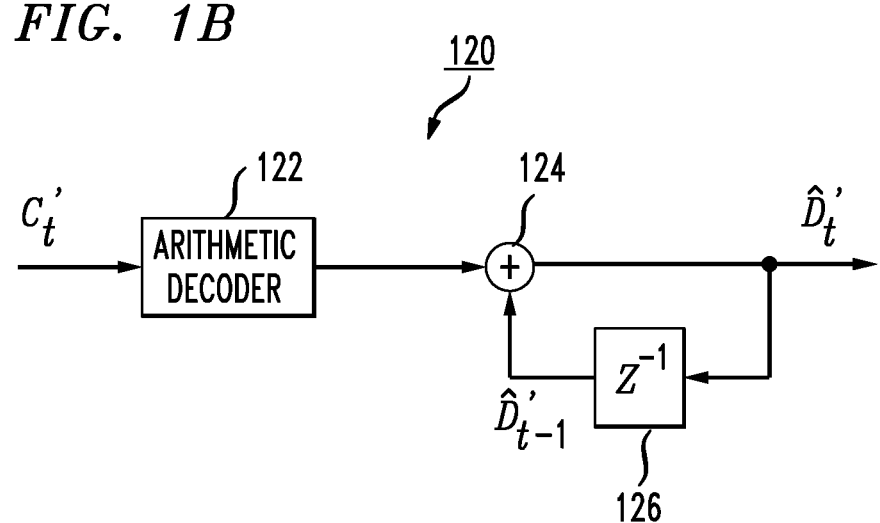
FIG. 1B is a block diagram of a decoder.

A DPCM decoder 120 is shown in FIG. 1B. The decoder 120 first decodes arithmetically the received samples 122 ($C'_t$) and computes the decoded samples 124, 126 ($\hat{D}'_t$). The quantization range of each node is determined by their bounding box. The quantization step size can be assumed to be the same for all nodes, or can vary in order to shape the encoded bitstream rate. Allowing different quantization step sizes for different nodes may result in artifacts such as mesh cracks, especially in the boundaries between nodes.

The discloser mentions above that $D_t$'s dimension is reduced to $p \leq n$ compared to $M_t$, since it does not contain vertices for which the displacement on all axes is zero. This property provides an advantage against MPEG-4's BIFS-Animation, which does not allow for reduced animation frames. For sparse $D_t$ matrices it may also be the case that a whole node is not animated thus allowing great animation flexibility and generating a scalable bitstream. Furthermore, in the case where $F_{i,t}=0, \forall i \in [1.1]$, the displacement matrix $D_t$ is zero, leading to an 'empty' frame. This property resembles the silence period inherent in speech audio streams and can be exploited in the application layer of RTP-based receivers to absorb network jitter. Inter-stream synchronization can also be achieved, which is paramount for many applications (e.g. lip synchronization of a 3-D animated virtual salesman with packet speech).

Next is described a channel model and error correction codes. The idea of Forward Error Correction (FEC) is to transmit additional redundant packets which can be used at the receiver to reconstruct lost packets. In the FEC process according to a preferred embodiment of the present invention, Reed-Solomon (RS) codes are used across packets. RS codes are the only non-trivial maximum distance separable codes known, hence they are suitable for protection against packet losses over bursty loss channels. An RS(n, k) code of length n and dimension k is defined over the Galois Field GF ($2^q$) and encodes k q-bit information symbols into a codeword of n such symbols, i.e. $n \leq 2^q - 1$. A sender needs to store copies of k information packets in order to calculate n–k redundancy packets. The resulting n packets are stacked in a block of packet (BOP) structure. This BOP structure is known in the art and thus not explained further herein. To maintain a constant total channel data rate, the source rate is reduced by the fraction k/n, called the code rate, resulting in an initially reduced animation quality. A receiver can begin decoding as soon as it receives any k correct symbols, or packets of a BOP.

In reality, the underlying bursty loss process of the Internet is quite complex, but it can be closely approximated by a 2-state Markov model. The two states are state G (good), where packets are timely and correctly received, and B (bad), where packets are either lost or delayed to the point that they that can be considered lost. The state transition probabilities $p_{GB}$ and $p_{BG}$ fully describe the model, but since they are not sufficiently intuitive, the model can be expressed using the average loss probability $P_B$, and the average burst length $L_B$, as:

$$P_B = Pr(B) = \frac{p_{GB}}{p_{GB} + p_{BG}} \quad (3)$$

$$L_B = 1/p_{BG}. \quad (4)$$

For the selection of the RS code parameters the probability needs to be known that a BOP cannot be reconstructed by the erasure decoder as a function of the channel and the RS code parameters. For an RS(n, k) code, this is the probability that more than n–k packets are lost within a BOP, and it is called the block error rate, $P_{BER}$. Let P (m, n) be the probability of m lost packets within a block of n packets, also called the block error density function. Then, the calculation is:

$$p_{BER} = \sum_{m=n-k+1}^{n} P(m, n) \quad (5)$$

The average loss probability $P_B$ and the average loss burst $L_B$ corresponding to the 2-state Markov model described above, relate to block error density function P (m, n). The exact nature of their relationship has been extensively studied and derived in the literature. Here we adapt the derivation for bit error channels to a packet loss channel.

The Markov model as described before is a renewal model, i.e. a loss event resets the loss process. Such a model is determined by the distribution of error-free intervals (gaps). If there occurs an event of gap length v such that v–1 packets are received between two lost packets, then the gap density function g(v) gives the probability of a gap length v, i.e. $g(v)=Pr(0^{v-1}|1)$. The gap distribution function G(v) gives the probability of a gap length greater than v–1, i.e. $G(v)=Pr(0^{v-1}|1)$. In state B of our model all packets are lost, while in state G all packets are received, yielding:

$$g(v) = \begin{cases} 1 - p_{BG}, & v = 1 \\ p_{BG}(1 - p_{GB})^{v-2} p_{GB}, & v > 1 \end{cases}$$

$$G(v) = \begin{cases} 1, & v = 1 \\ p_{BG}(1 - p_{GB})^{v-2}, & v > 1 \end{cases}$$

Let R(m, n) be the probability of m–1 packet losses within the next n–1 packets following a lost packet. This probability can be calculated from the recurrence:

$$R(m, n) = \begin{cases} G(n), & m = 1 \\ \sum_{v=1}^{n-m+1} g(v) R(m-1, n-v), & 2 \leq m \leq n \end{cases}$$

Then, the block error density function P (m, n) or probability of m lost packets within a block of n packets is given by:

$$P(m, n) = \begin{cases} 1 - \sum_{v=1}^{n} P(m, v), & m = 0 \\ \sum_{v=1}^{n-m+1} P_B G(v) R(m, n-v+1), & 1 \leq m \leq n \end{cases}$$

where $P_B$ is the average error probability.

From Eq. 5, it is noted that P (m, n) determines the performance of the FEC scheme, and can be expressed as a function of $P_B$, $L_B$ using Eq. 3 and 4. As explained below, the expression of P (m, n) can be used in a RS(m, n) FEC scheme for optimized source/channel rate allocation that minimizes the visual distortion.

Next is described a bitstream format and packetization process. The output bitstream of the 3D-Animation codec needs to be appropriately packetized for streaming with an application-level transport protocol, e.g. RTP. This process for a single layer bit-stream is known and its main features are summarized by the following three concepts:

(1) In order to describe which nodes of the model are to be animated the animation masks, NodeMask and VertexMasks are defined in a similar way to BIFS-Anim. The NodeMask is essentially a bit-mask where each bit, if set, denotes that the corresponding node in the Node Table will be animated. The Node Table (an ordered list of all nodes in the scene) is either known a priori at the receiver since the reference wireframe model exists there already, or is downloaded by other means. In a similar way, the VertexMasks are defined, one per axis, for the vertices to be animated.

(2) In its simplest form, one frame (which represents one Application Data Unit (ADU)), is contained in one RTP packet. In this sense, the 3D-Animation codec's output bit-stream is 'naturally packetizable' according to the known Application Level Framing (ALF) principle. An RTP packet payload format is considered starting with the NodeMask and VertexMasks, followed by the encoded samples along each axis.

(3) The M bit in the RTP header must be set for the first of a series of 'empty' frames, which (if they exist) can be grouped together.

This simple format suffices for light animations with a modest number of vertices. However, sequences with high scene complexity or high-resolution meshes may generate a large number of coded data after compression, resulting in frames that potentially exceed the path MTU. In such cases, raw packetization in a single layer would require the definition of fragmentation rules for the RTP payload, which may not always be straightforward in the ALF sense. Furthermore, frames directly packetized in RTP as described above generate a variable bitrate stream due to their varying lengths.

A more efficient packetization scheme is sought that satisfies the requirements set out above: (a) to accommodate layered bitstreams, and (b) to produce a constant bitrate stream. This efficiency can be achieved by appropriately adapting the block structure known as Block-Of-Packets (BOP). In this method, encoded frames of a single layer are placed sequentially in line order of an n-line by $S_p$-column grid structure and then RS codes are generated vertically across the grid. For data frames protected by an RS (n, k) erasure code, error resilience information is appended so that the length of the grid is n for k frames of source data. This method is most appropriate for packet networks with burst packet errors, and can be fully described by the sequence frame rate FR, the packet size $S_p$, the data frame rate in a BOP $F_{BOP}$ and the RS code (n, k).

Intuitively, for a BOP consisting of $F_{BOP}$ data frames, with $S_p$ bytes long packets, at FR frame rate, the total source and channel bitrate R is given by:

$$R = \frac{n \cdot FR \cdot S_P}{F_{BOP}} \quad (6)$$

This equation serves as a guide to the design of efficient packetization schemes by appropriately balancing the parameters $F_{BOP}$, n and $S_p$. It also encompasses the trade-off between delay and resilience. For a layered bitstream, a design is needed for one BOP structure per layer. By varying the parameters in Eq. 6, different RS code rates can be allocated to each layer, thus providing unequal level of error protection to each layer. The way these parameters are adjusted in practice for the application of 3-D animation streaming, considering a measure of visual error, is explained next.

In order to measure the visual loss resulting from a non-perfect reconstruction of the animated mesh at the receiver, a metric is required that is able to capture the visual difference between the original mesh $M_t$ at time t and its decoded equivalent $\hat{M}_t$. The simplest measure is the RMS geometric distance between corresponding vertices. Alternatively, the Hausdorff Distance has been commonly used as an error metric. The Hausdorff distance is defined in the present case as the maximum minimum distance between the vertices of two sets, $M_t$ and $\hat{M}_t$ in such a way that every point $M_t$ lies within the distance H $(M_t, \hat{M}_t)$ of every point in $\hat{M}_t$ and vice versa. This can be expressed as:

$$H(M_t, \hat{M}_t) = \max(h(M_t, \hat{M}_t), h(\hat{M}_t, M_t)) \quad (7)$$

where $h(M_t, \hat{M}_t) = \max_{m_t \in M_t} \min_{\hat{m}_t \in \hat{M}_t} \|m_t - \hat{m}_t\|$, and $\|\cdot\|$ is the Euclidean distance between the two vertices, $m_t$ and $\hat{m}$. Many other distortion metrics can be derived by equivalence to natural video coding, such SNR and PSNR, but they are tailored to the statistical properties of the specific signal they encode, failing to give a uniform measure of user perceived distortion across a number of signals and encoding methods over different media. Moreover, especially for 3-D meshes, all these metrics give only objective indications of geometric closeness, or signal to noise ratios, and they fail to capture the more subtle visual properties the human eye appreciates, such as surface smoothness.

FIG. 2 illustrates a comparative plot 200 of distortion metrics: PSNR, Hausdorff Distance, and Visual Smoothness for 150 frames of the animated sequence BOUNCEBALL with I-frame frequency at 8 Hz. The two upper plots (PSNR-Hausdorff) show the expected correlation between the corresponding metrics of geometric distance and Hausdorff Distance (eq. 7) they represent. The two lower plots indicate that the visual distortion (eq. 8) might be low in cases where the geometric distance is high and vice-versa.

One attempt that was made in the direction of using surface smoothness was reported by Karni and Gotsman as being undertaken whilst evaluating their spectral compression algorithm for 3-D mesh geometries. See, Zachi Karni and Craig Gotsman, "Spectral compression for mesh geometry," in Siggraph 2000, *Computer Graphics Proceedings*, Kurt Akeley, Ed. 2000, pp. 279-286, ACM Press/ACM SIGGRAPH/Addison Wesley Longman, incorporated herein by reference. In this, the suggested 3-D mesh distortion metric normalizes the objective error computed as the Euclidean Distance between two vertices, by each vertex's distance to its adjacent vertices. This type of error metric captures the surface smoothness of the 3-D mesh. This may be achieved by a Laplacian operator, which takes into account both topology and geometry. The value of this geometric Laplacian at vertex $v_i$ is:

$$GL(v_i) = v_i - \frac{\sum_{j \in n(i)} l_{ij}^{-1} v_j}{\sum_{j \in n(i)} l_{ij}^{-1}}$$

where n(i) is the set of indices of the neighbors of vertex i, and $l_{ij}$ is the geometric distance between vertices i and j. Hence, the new metric is defined as the average of the norm of the geometric distance between meshes and the norm of the Laplacian difference ($m_t$, $\hat{m}_t$ are the vertex sets of meshes $M_t$, $\hat{M}_t$ respectively, and n the set size of $M_t$, $\hat{M}_t$):

$$\|M_t - \hat{M}_t\| = \frac{1}{2n}(\|m_t - \hat{m}_t\| + \|GL(m_t) - GL(\hat{m}_t)\|) \quad (8)$$

This metric in Eq. 8 is preferably used in the present invention, and will be referred to hereafter as the Visual Smoothness metric (VS). Other equations that also relate to the visual smoothness of the mesh may also be used.

The VS metric requires connectivity information such as the adjacent vertices of every vertex $m_t$. For the case of the 3D-Animation codec, where it is assumed that no connectivity changes during the animation, the vertex adjacencies can be precomputed.

The BOP structure described above is suitable for the design of an efficient packetization scheme that employs redundancy information based on RS erasure codes. The relation of its design parameters was also shown in Eq. 6. This equation, though, does not reflect any information about layering. An exemplary layering design approach is described next, followed by the proposed error resilient method for 3-D wireframe streaming.

The layering is performed in a way that the average VS value of each layer reflects its importance in the animation sequence. To achieve this, the VS from Eq. 8 is computed for every node in the mesh independently and the nodes are ordered according to their average VS in the sequence. A node, or group of nodes, with the highest average VS forms the first and most important layer visually, $L_0$. This is the layer that should be more resilient to packet errors than other layers. Subsequent importance layers $L_1, \ldots, L_M$ are created by correspondingly subsequent nodes, or group of nodes, in the VS order.

If a 3-D mesh has more nodes than the desirable number of layers, then the number of nodes to be grouped in the same layer is a design choice, and dictates the output bitrate of the layer. For meshes with only a few nodes but large number of vertices per node, node partitioning might be desirable. The partitioning would restructure the 3-D mesh's vertices in a new mesh with more nodes than originally. This process will affect connectivity, but not the overall rendered model. Mesh partitioning into nodes, if it is possible, should not be arbitrary, but should rather reflect the natural objects these new nodes will represent in the 3-D scene and their corresponding motion. If partitioning is not possible in the above sense, one could partition the mesh in arbitrary sized sub-meshes (nodes) that will be allocated to the same layer. Mesh partitioning may require complex pre-processing steps that would be understood by one of skill in the art. Recall, however, that the 3D-Animation codec assumes static connectivity.

It is common practice in "natural video" to build layers with a cumulative effect. That is, layer $L_j$ data add detail to the data of layer $L_{j-1}$ and improve the overall quality of video. But, one can decode only up to layer $L_{j-1}$ and forget about the refinement layers. This approach may be taken in an adaptive streaming scenario, where a sender may choose to send only j-1 layers during congested network conditions, and j or more layers when the network conditions improve, i.e., more bandwidth becomes available.

The nature of 3-D animation layers disclosed herein is not always cumulative in the same sense. Decoding layer $L_j$ (which has been built with appropriate node grouping or node partitioning) does not necessarily only refine the quality of data contained in previous layers $L_0 \ldots L_{j-1}$, but adds animation details to the animated model by, for example, adding animation to more vertices in the model.

As an example, consider the sequence TELLY (discussed more fully below), which is a head-and-shoulders talking avatar. TELLY always faces the camera (static camera). Since the camera does not move, it is a waste of bandwidth to animate the back side of the hair. However, one can easily detect the visible and invisible parts (set of vertices) of the hair and with appropriate partitioning of node "hair" to allocate the visible part to layer $L_{j-1}$ and the invisible part to layer $L_j$. In the case of a static camera (and where no interactivity is allowed) layer $L_j$ is not transmitted. Thus when a user views the wireframe mesh or animation in a static mode, only the visible portions of the animation can be seen since the animation does not rotate or move. In the case where the user should be able to examine the animation by rotating or zooming in on the avatar (or other model), or look at the back side of it, layer $L_j$ is sent. In this case, the user views the animation in an interactive mode that enables the user to view portions of the animation that were invisible in the static mode, due to the lack of motion of the animation. But, layer $L_j$ does not refine the animation of the visible node of the hair in layer $L_{j-1}$. It contains additional animation data for the invisible vertices. This provides an example result of the partitioning method.

Further, the "interactive mode" does not necessarily require user interaction with the animation. The interactive mode refers to any viewing mode wherein the animation can move or rotate to expose a portion of the animation previously hidden. Thus, in some cases where the viewer is simply looking at the animation, the animation may move and rotate in a more human or natural way while speaking. In this case, the $L_j$ layer or other invisible layers may be sent to provide the additional animation data to complete the viewing experience. In this regard, the static or interactive mode may depend on bandwidth available. I.e., if enough bandwidth is available to transmit both visible and invisible layers of the animation, then the animation can be viewed in an interactive mode instead of a static mode. In another aspect of the invention, the user may select the static or interactive mode and thus control what layers are transmitted.

Figure 3A:
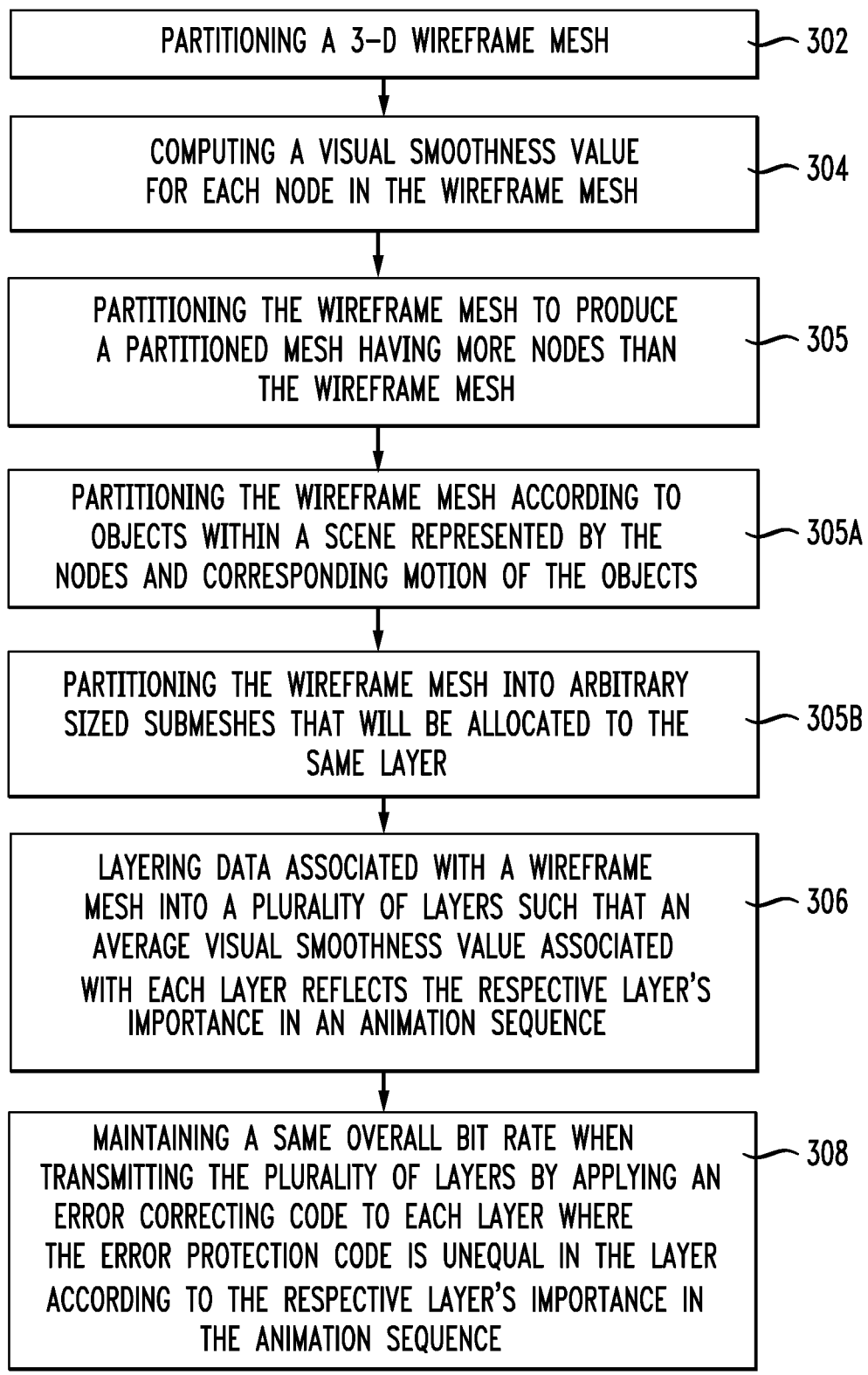
FIG. 3A represents a flowchart of method of error resilient wireframe streaming.

FIG. 3A illustrates an example set of steps according to an aspect of the invention. The method comprises partitioning the 3-D wireframe mesh (302), computing the VS value for each node in the mesh (304) and layering data associated with the wireframe mesh into a plurality of layers such that an average VS value associated with each layer reflects the respective layer's importance in an animation sequence (306). A step of partitioning the wireframes mesh (305) may also be included prior to layering. The partitioning can provide a partitioned mesh having more nodes than the wireframe mesh. The partitioning may be done according to objects within a scene represented by the nodes and a corresponding motion of the objects (305A). The partitioning may also partition the wireframe mesh into or between signal submeshes that will be allocated to the same layer (305B). The same overall bitrate is maintained when transmitting the plurality of layers by applying the error correction code to each layer where the error correction code is unequal in the layer according to the layer's importance (308).

The terms "partition" as used herein can mean a preprocessing step such as partitioning the mesh into arbitrary or non-arbitrary sub-meshes that will be allocated to the same layer. Further, the term may also have other applications, such as the process of generating the various layers comprising one or more nodes.

Figure 3B:
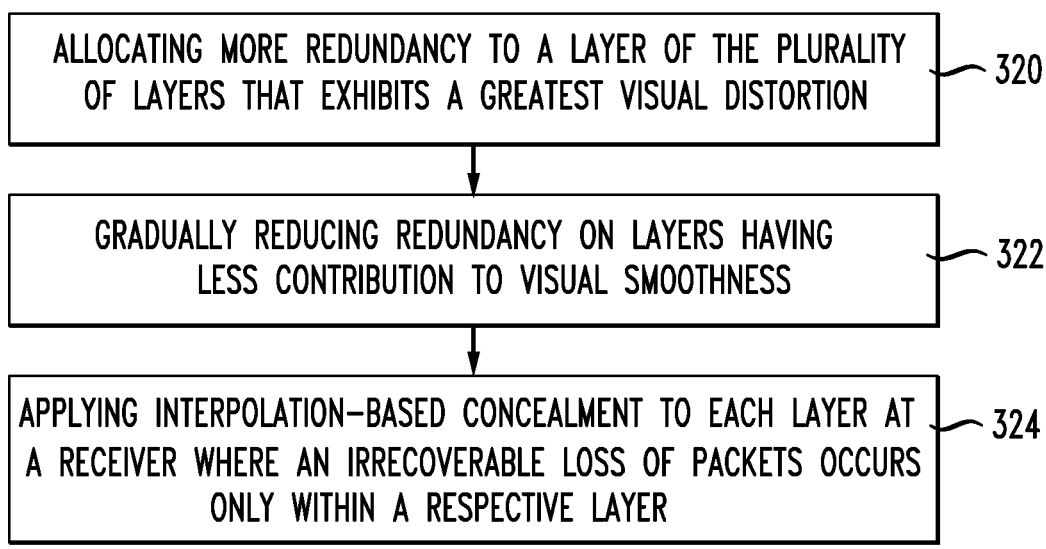
FIG. 3B illustrates a flowchart according to an aspect of the invention.

FIG. 3B illustrates a flowchart of another aspect of the invention. The method comprises allocating more redundancy to a layer of the plurality of layers that exhibits the greatest visual distortion (320). This may be, for example, a layer comprising visually coarse information. Next, the redundancy is gradually reduced on layers having less contribution to visual smoothness (322). Interpolation-based concealment is applied to each layer at the receiver where an irrecoverable loss of packets occurs only within the respective layer (324) from the standpoint of the receiver. As packets belonging to a particular layer travel through the communications network, they may take different paths from the sender to the receiver, thus suffering variable delays and losses. When the receiver sees an overall packet loss rate, the receiver will try to reduce the loss rate by using the redundant information (FEC) provided separately in each layer. The amount of FEC may not be enough to recover all missing packets (residual packets). The interpolation-based concealment can be applied to each layer independently to reduce the distortion introduced by residual packet loss. In general, steps 320 and 322 are performed on the coding/transmitter end and step 324 is performed at the receiver over a communications network, such as a peer-to-peer network.

The expected distortion of the animation at the receiver at time t is the sum of the product quantities $P_{jt} \cdot D_{jt}$ where j is the layer index, $D_{jt}$ is the visual distortion incurred by missing information in layer j at time t, and $P_{jt}$ is the probability of having an irrecoverable packet loss in layer j. By the way we constructed the layers, the probabilities $P_{jt}$ are independent, and a burst packet loss in a layer contributes its own visual distortion $D_{jt}$ in the decoded sequence. Formally, the expected visual smoothness $VS_{(t)}$ of an animation at the decoder at time t can be expressed as:

$$VS_{(t)} = \sum_{j=0}^{L-1} P_{jt} D_{jt}, \quad \forall t \quad (9)$$

where L is the number of layers. In the equation above, $P_{jt}$ is the block error rate $P_{BER}$ as given by Eq. 5, or the probability of losing more than $n-k_j$ packets in layer j. Using the block error density function P (m, n), the following is derived:

$$P_{jt} = \sum_{m=n-k_{jt}+1}^{n} P(m, n) \quad (10)$$

From Eqs. 9 and 10, $VS_{(t)}$ can be described as:

$$VS_{(t)} = \sum_{j=0}^{L-1} \sum_{m=n-k_{jt}+1}^{n} P(m, n) D_{jt}, \quad \forall t \quad (11)$$

Equation 11 estimates in a statistical sense the expected visual smoothness experienced per frame at the decoder. The objective is to minimize this distortion with respect to the values of $k_{jt}$'s in Eq. 11. From the way the bitstream is split into layers it is expected that the optimization process allocates more redundancy to the layer that exhibits the greatest visual distortion (coarse layer), and gradually reduces the redundancy rate on layers with finest contribution to the overall smoothness. There are L values of $k_{jt}$ that need to be calculated at every time t, that follow the conditions $0 \leq k_{jt} \leq n$ and $$\sum_{j=0}^{L-1} (n - k_{jt}) = R_C / q$$

where $R_C$ the redundancy bits, and q is the symbol size. The above problem formulation yields a non-linear constraint optimization problem that can be solved numerically.

The anticipated behavior of the model for $P_B=0$ is to produce equal values for $k_{jt}$'s, whereas in high $P_B$'s unequally varying $k_{jt}$'s would be obtained. Note that for the calculation of smoothness distortions in Eq. 11, it is assumed that no error concealment takes place at the receiver.

It has been shown that techniques based on vertex linear interpolation are a sufficient and efficient method of error concealment for 3D-Animation frames. This relies on the 'locality of reference principle', according to which high-frame rate animations are unlikely to exhibit vertex trajectories other than linear or piece-wise linear. If higher complexity can be accommodated, higher order interpolation can be employed by using information from the neighboring frames. Some known interpolation and other concealment methods are generic in that they can be used by any other decoder.

Figure 4:
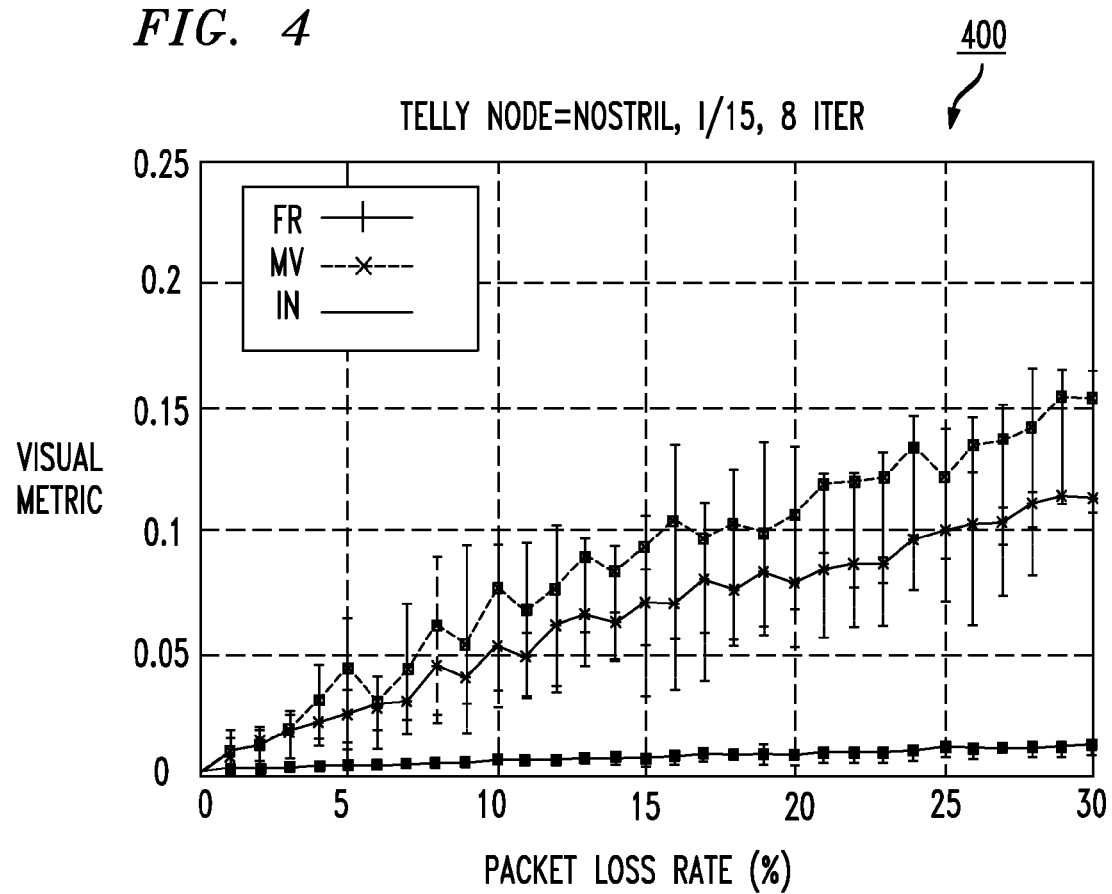
FIG. 4 is a comparative plot of three error concealment methods for sequence for wireframe animation TELLY.

FIG. 4 is a graph 400 illustrating the relative performances of three error concealment methods adapted to the experimental parameters of this work, namely $P_B=[0.30]$ and $L_B=4$. It is evident that linear interpolation outperforms Frame Repetition or Motion Vector-based methods. The plot shows average values for 8 iterations with different loss patterns. It is clear on the plot (as seen by the error bars) that the interpolation concealment method exhibits very low variance, verifying the locality of reference principle (the average loss burst length $L_B=4$ is much lower than the sequence frame rate of 30 Hz.) Therefore, the present invention preferably uses interpolation-based error concealment at the receiver in the case where the channel decoder receives less than $n-k_{jt}$ BOP packets. In fact, the $k_{jt}$'s that provide a solution to the optimization problem, will also give minimum distortion if combined with concealment techniques. The expected distortion in such cases will be lower than the distortion without error concealment.

The following explains the experimental procedure and how to tune the values and the optimization process for a real-world case of 3-D wireframe animation, along with discussion of experimental results using the present invention.

The following experiments demonstrate through simulation the efficiency of the proposed Unequal Error Protection (UEP) scheme combined with Error Concealment (EC) for streaming 3-D wireframe animations. In particular, using UEP with EC is compared to simple UEP, to Equal Error Protection (EEP) and to No Protection (NP). The comparison is based on the Visual Smoothness metric, which is known to yield a distortion measure that captures the surface smoothness of the time-dependent mesh during the animation. For the calculation of the parameters $k_{jt}$, the constrained minimization problem of Eq. 11 is numerically solved, given the channel rate $R_C$. Furthermore, n is calculated from Eq. 6 such that the rate characteristics of the original source signal are met for the particular design of a BOP. The other parameters used in Eq. 6 are given below for the two sequences in the experiments, and are also summarized in Table 1.

TABLE I

ANIMATION SEQUENCE PARAMETERS
USED IN THE REDUNDANCY EXPERIMENTS:
TELLY & BOUNCEBALL.

| Sequence | | TELLY | |
|---|---|---|---|
| $df_{TELLY}$ | | 0.75 | |
| Nodes | | 9 | |
| Frame Rate | | 30 Hz | |
| Source Rate | | 220 Kbps | |
| Channel Rate | | 33 Kbps | |
| Frames | | 780 | |
| Layer 0 | | UpperLip | |
| | | LowerLip | |
| | | Tongue | |
| Layer 1 | | Skin | |
| | | Teeth | |
| Layer 2 | | EyeLash | |
| | | EyeBrow | |
| | | EyeCorner | |
| | | Nostril | |
| Sequence | | BOUNCEBALL | |
| $df_{BBALL}$ | | 1.0 | |
| Nodes | | 1 | |
| Frame Rate | | 24 Hz | |
| Source Rate | | 61 Kbps | |
| Channel Rate | | 9.15 Kbps | |
| Frames | | 528 | |
| Layer 0 | | Bounceball | |
| | | TELLY | BBALL |
| $L_0$: | $S_P$ | 264 | 200 |
| | $F_{BOF}$ | 16 | 35 |
| $L_1$: | $S_P$ | 264 | 200 |
| | $F_{BOF}$ | 19 | 35 |
| $L_2$: | $S_P$ | 150 | N/A |
| | $F_{BOF}$ | 50 | N/A |

For the EEP case, a constant k is considered that can be derived directly from the selection of the channel rate, which is set to 15%. For the NP case, all available channel rates to the source are allocated. Finally, an EC scheme was used based on interpolation for the case of UEP with residual losses. In all experiments used $L_B$=4.

The sequences TELLY and BOUNCEBALL were used with density factors of $df_{TELLY}$=0.75 and $df_{BBALL}$=1.0 given by Eq. 2. TELLY consists of 9 nodes (out of which 3 are relatively sparse, and the remaining 6 are complete) and totals 780 frames at 30 Hz as shown in Table I. Its average source bitrate is $R_{S,TELLY}$=220 Kbps. BOUNCEBALL only has 1 complete node and 528 frames at 24 Hz, forming 1 layer of source rate $R_{S,BALL}$=61 Kbps average. Both sequences have been coded with I-frames at every 15 frames. Roughly 15% of channel coding redundancy was allowed, resulting in total source and channel coding redundancy, resulting in total source and channel rates of $R_{TELLY}$=253 Kbps and $R_{BBALL}$=70.15 Kbps. Choosing n=32 the parameters, from Eq. 6 the calculations for each layer's packetization are tabulated in Table I. The value of n is chosen as a compromise between latency and efficiency, since higher n makes the RS codes more resilient, by sacrificing delay and buffer space.

Sequence TELLY was split into 3 layers according to the suggested layering method presented in Section V, each consisting of the nodes shown in Table I. Each layer's fraction of the total number of animated vertices in the 3-D mesh is ($L_0$, $L_1$, $L_2$)=(0.48, 0.42, 0.10) on average. This splitting is expected to reflect the source bitrates of each layer proportionally. It was noticed that the suggested layering scheme allocated 2 out of 3 sparse nodes to the same layer, $L_1$. The total number of vertices of these two sparse nodes represents 65% of the vertices in the reference mesh. The third sparse node, Nostril, was allocated to layer $L_2$, but its individual motion relates to a very small fraction of the model's total number of vertices ($\approx$1.30%). This fact may bear some significance if one desires to relate the node-to-layer allocation (using the VS metric) to the density factor $df_L$, calculated per layer[4] (Eq. 2), and to the output bitrates. If such relation exists, a dynamic layering scheme may be developed for applications with such needs.

Sequence BOUNCEBALL initially contains only one node. The sequence represents a soft ball with inherent symmetry around a center point as its shape implies. The ball also deforms slightly as it bounces. Given the shape symmetry, it was decided to partition the mesh into 2 nodes of equal number of vertices without respect to the VS metric for each node. The logic behind this partitioning is to attempt to verify the effect the VS metric has on the proposed UEP resilience scheme. All other source coding parameters are constant between the two layers, most importantly the quantization step size. It is anticipated that both layers will receive roughly equal average protection bits, so that UEP performance will approach that of EEP.

Figure 5A:
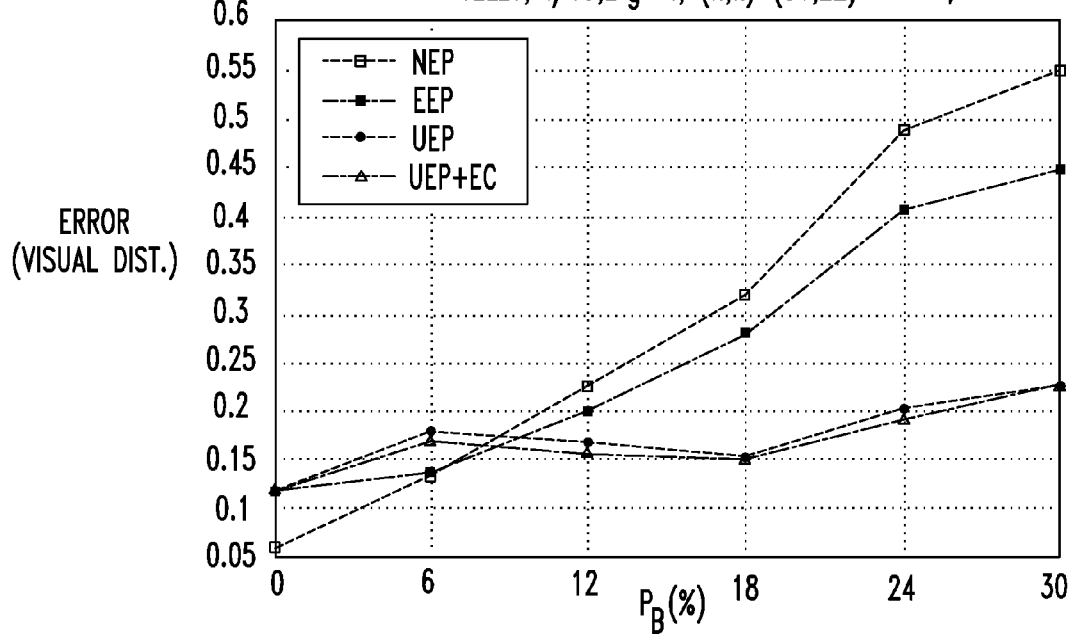
FIG. 5 is a comparative plot of Visual smoothness (VS) transmitted and decoded frames of 3 layers of the wireframe animation TELLY.
Figure 5B:
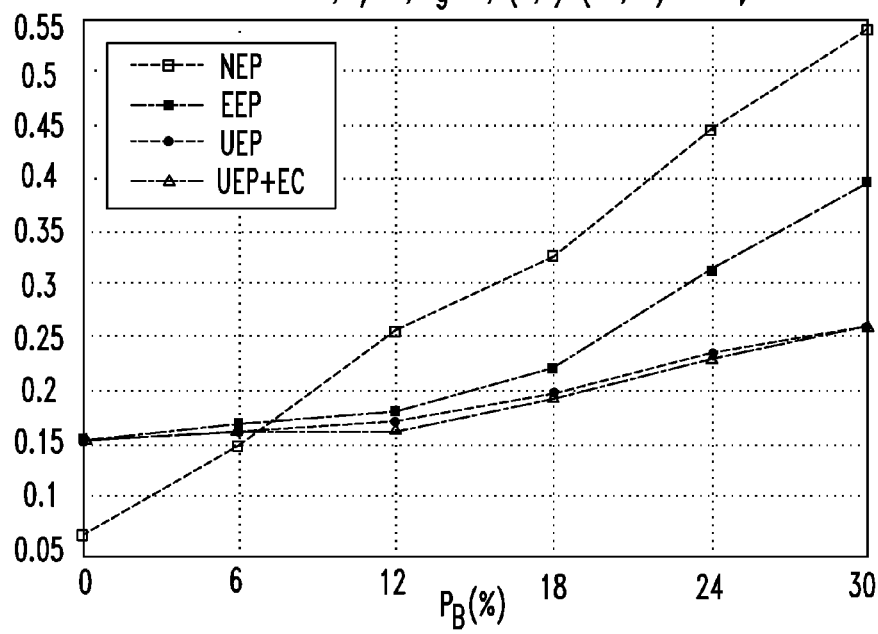

FIG. 5 depicts a first diagram 502 illustrating VS as a function of the average packet loss rate, $P_B$, for TELLY. The four curves on the plot represent each suggested resilience method, for the code (31, 22). The average calculated codes for the UEP are as follows (rounded to nearest integer): (n, $\bar{k}_0$)=(31,19),(n,$\bar{k}_1$)=(31,23),(n,$\bar{k}_2$)=(31,28). It is clear that UEP, and UEP+EC outperform NP and EEP for medium to high loss rates of $P_B$>9%. Recall that the layering is performed in such a way that the lowest layer exhibited high average visual distortion. Since the UEP method allocates higher codes to the lower layer ($L_0$), better resilience is expected for $L_0$ at high loss rates. This factor dominates in the average distortion, resulting in better performance. At low loss rates it was noticed that EEP and UEP behave in approximately the same way, as the RS codes are more than sufficient to recover all or most errors. It is also noted that the NP method under conditions of no loss is much better than any other. This is an intuitive result, since source information takes all available channel rate, thus better encoding the signal. It is also worth noticing the effect of EC: the distortion of the UEP+EC scheme is slightly improved over the simple UEP case. This is also expected.

The results for the (31,27) RS code on sequence TELLY, shown in plot 504 of FIG. 5, are similar. Here, the threshold where the UEP methods (with or without EC) take over EEP or NP is around $P_B$=7%. Note how the initial NP performance (low $P_B$'S) is steep compared to the (31, 22), highlighting again the fact that channel coding bits are actually 'wasted' since they do not contribute much resilience in this low loss region, at the expense of source rate. The corresponding average codes per layer are: (n,$\bar{k}_0$)=(31,26),(n,$\bar{k}_1$)=(31,28),(n,$\bar{k}_2$)=(31,30). There is an improvement again in the UEP method's performance resulting from the error concealment's interpolation algorithm. As this quantity has not been accounted for in the optimization problem it is expected to contribute a small reduction to the visual error.

FIG. 6 shows the results 602 achieved for the same experiment repeated over the BOUNCEBALL sequence, which was 'symmetrically' layered as described earlier in this section. The same (31, 22) EEP code was used as before for comparison. The graph 602 shows the same trends and relative performances as in TELLY, with UEP+EC being the one giving the best overall performance. It is noted, however, that the distance of the UEP curves from the EEP ones decreased considerably compared to the TELLY sequence at high $P_B$'s. The average integer calculated RS codes for the UEP case are: $(n,\bar{K}_0)=(31,22)$, $(n,\bar{K}_1)=(31,22)$, i.e. equivalent to the EEP case. This may be a surprising result at the first glance, but careful reasoning suggests that equally balanced layers in terms of the amount of animation they contain (same number of vertices, nodes, very similar motion in the scene, and same encoding parameters) correspond to visually balanced distortions. This is exactly the expected result when layering for the BOUNCEBALL sequence described above. In fact, the real values of $k_{0t}$, $k_{1t}$ computed as the solution to the optimization problem, vary around the average integer value of 22. Furthermore, recall that the original symmetric BOUNCEBALL mesh was partitioned into two arbitrary nodes without consideration to their individual visual distortions, which were assumed to be similar. In fact, the softball's deformation at the bouncing points reduces the symmetry of the original shape. These facts reasonably explain why the UEP and EEP curves are not accurately fit at higher $P_B$'s as one would normally expect. Finally, it is noted that the UEP+EC method provides a slight, but hardly noticeable, improvement to the visual distortion as in the previous experiment.

The present invention addresses the fundamental problem of how best to utilize the available channel capacity for streaming 3-D wireframe animation in such a way as to achieve optimal subjective resilience to error. In short, the invention links channel coding, packetization, and layering with a subjective parameter that measures visual smoothness in the reconstructed image. On this basis, it is believed that the result may help open the way for 3-D animation to become a serious networked media type. The disclosed methods attempt to optimize the distribution of the bit budget allocation reserved for channel coding amongst different layers, using a metric that reflects the human eye's visual property of detecting surface smoothness on time-dependent meshes. Using this metric, the encoded bitstream is initially partitioned into layers of visual importance, and experimental results show that UEP combined with EC yields good protection against burst packet errors occurring on the Internet.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection, either wired or wireless, as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. For example, peer-to-peer distributed environments provide an ideal communications network wherein the principles of the present invention would apply and be beneficial. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:

computing, via a processor, visual smoothness values for each node in a wireframe mesh, each node comprising an indexed set of vertices in the wireframe mesh;

partitioning the indexed set of vertices to produce a partitioned mesh having more nodes than the wireframe mesh;

computing a visual smoothness for each node in the partitioned mesh;

layering data describing the wireframe mesh into a plurality of layers by ordering nodes into a respective layer according to whether the nodes have a similar visual smoothness; and allocating first nodes associated with visible parts of the wireframe mesh to a first layer of the plurality of layers and allocating second nodes associated with non-visible parts to a second layer of the plurality of layers, wherein the second layer is only transmitted to a decoder where a user at the decoder is able to rotate the wireframe mesh to view the nodes associated with the non-visible parts, wherein average visual smoothness values associated with each of the plurality of layers reflect a respective layer's importance in the animation sequence;

applying different parameters n, FR, Sp, and $F_{BOP}$ to a channel bitrate algorithm that applies to a block-of-packets structure for each layer of the plurality of layers, the channel bitrate algorithm comprising:

$$R=(N*FR*Sp)/F_{BOP}$$

wherein R is a bitrate, n is a number of lines, and Sp is a number of columns in the block-of-packets structure, FR is a sequence frame rate, and $F_{BOP}$ is a number of data frames in the block-of-packets structure for a respective layer; and applying unequal error protection to each respective layer of the plurality of layers according to a result of the channel bitrate algorithm.

2. The method of claim 1, wherein each layer of the plurality of layers comprises one of a node and a group of nodes within the wireframe mesh.

3. The method of claim 1, wherein a most important portion of the plurality of layers comprises the average visual smoothness value with a highest value and is error coded to be most resilient to packet errors.

4. The method of claim 1, wherein a number of nodes within a particular portion of the plurality of layers is associated with an output bit rate of the particular portion of the plurality of layers.

5. The method of claim 1, further comprising producing a 3-D packetized streaming signal representative of a scene comprising animation associated with the wireframe mesh.

6. The method of claim 1, wherein partitioning further comprises partitioning the wireframe mesh into arbitrary sized sub-meshes that will be allocated to a same layer.

7. A method comprising:

receiving streamed data from a source;

generating, from the streamed data, a representation of a wireframe mesh partitioned to produce a partitioned mesh having more nodes than the wireframe mesh, wherein the wireframe mesh is partitioned to yield partitions corresponding to different objects within a scene represented by the nodes of the partitioned mesh and a corresponding motion of the different objects in an animation sequence, the partitions being balanced based on a number of nodes in each partition, encoding parameters, and the corresponding motion associated with each partition, the streamed data based on an unequal error protection scheme, wherein:

the streamed data comprises a portion of a dataset at the source describing the wireframe mesh, the dataset comprising a plurality of layers associated with different average visual smoothness values that reflect a respective layer's importance in an animation sequence;

a layer of the plurality of layers in the dataset comprises a plurality of partitions that identifies data in the layer that is visible and invisible when an animation in the animation sequence is in a static mode;

the portion of the dataset comprises a portion of a plurality of layers and a portion of the plurality of partitions unassociated with the portion of the plurality of layers; and the portion of the dataset is selected to be supportable by the current bandwidth and to provide largest ones of the average visual smoothness values; and applying, via a processor, applying different parameters n, FR, Sp, and $F_{BOP}$ to a channel bitrate algorithm that applies to a block-of-packets structure for each layer of the plurality of layers, the channel bitrate algorithm comprising:

$R=(N*FR*Sp)/F_{BOP}$ wherein R is a bitrate, n is a number of lines, and Sp is a number of columns in the block-of-packets structure, FR is a sequence frame rate, and $F_{BOP}$ is a number of data frames in the block-of-packets structure for a respective layer; and applying an unequal error concealment scheme to each respective layer in the pluarilty of layers according to a result of the channel bitrate algorithm.

8. The method of claim 7, wherein the unequal error protection scheme comprises optimizing a distribution of a bit budget allocation amongst the plurality of layers.

9. The method of claim 7, wherein the plurality of layers are partitioned according to visual importance.

10. The method of claim 7, wherein interpolation-based concealment is applied to residual packets not recovered from error-concealment.

* * * * *

UNITED STATES PATENT AND TRADEMARK OFFICE
CERTIFICATE OF CORRECTION

Page 1 of 1

PATENT NO. : 8,421,804 B2
APPLICATION NO. : 11/059118
DATED : April 16, 2013
INVENTOR(S) : Joern Ostermann et al.

It is certified that error appears in the above-identified patent and that said Letters Patent is hereby corrected as shown below:

On the Title Page, please insert the following section:

--Related U.S. Application Data

(60) Continuation of PCT Application No. PCT/US03/25761, filed on August 15, 2003, which claims priority to U.S. Provisional Patent Application No. 60/404,410, filed August 20, 2002.--

Signed and Sealed this
Fourth Day of August, 2015

Michelle K. Lee
*Director of the United States Patent and Trademark Office*